US009199190B2

(12) United States Patent
Malik et al.

(10) Patent No.: US 9,199,190 B2
(45) Date of Patent: Dec. 1, 2015

(54) VERTICAL BAFFLE IN HORIZONTAL ADSORBER VESSELS

(75) Inventors: Nasim ul Hassan Malik, London (GB); Stephen John Gibbon, Surrey (GB); Reza Alvani, Surrey (GB); Michaela Pollock, Surrey (GB); William Thomas Kleinberg, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 182 days.

(21) Appl. No.: 13/982,429

(22) PCT Filed: Mar. 9, 2011

(86) PCT No.: PCT/US2011/027725
§ 371 (c)(1),
(2), (4) Date: Jul. 29, 2013

(87) PCT Pub. No.: WO2012/121718
PCT Pub. Date: Sep. 13, 2012

(65) Prior Publication Data
US 2013/0305929 A1    Nov. 21, 2013

(51) Int. Cl.
*B01D 53/04*    (2006.01)
(52) U.S. Cl.
CPC ........ *B01D 53/0446* (2013.01); *B01D 53/0423* (2013.01); *B01D 2259/402* (2013.01)
(58) Field of Classification Search
CPC ........... B01D 53/0446; B01D 53/0423; B01D 2259/402
USPC .................................................. 96/139, 152
See application file for complete search history.

(56) References Cited

U.S. PATENT DOCUMENTS

| 2,435,781 | A | | 2/1948 | Heydorn | |
|---|---|---|---|---|---|
| 2,790,505 | A | * | 4/1957 | Dow | ................ 95/124 |
| 3,432,995 | A | * | 3/1969 | Jaeger et al. | ................ 96/126 |
| 3,722,189 | A | * | 3/1973 | Tourtellotte | ................ 96/152 |
| 4,133,659 | A | * | 1/1979 | Beckman | ................ 96/129 |
| 4,224,147 | A | * | 9/1980 | Traut | ................ 210/660 |
| 4,353,716 | A | | 10/1982 | Rohde | |
| 4,364,753 | A | | 12/1982 | Wagner | |
| 4,930,294 | A | | 6/1990 | Meier | |

(Continued)

FOREIGN PATENT DOCUMENTS

| CN | 1176843 A | 3/1998 |
|---|---|---|
| DE | 3644126 A1 | 7/1988 |

(Continued)

OTHER PUBLICATIONS

European Patent Office, International Search Report and Written Opinion for International Application No. PCT/US2011/027725, mailed Dec. 6, 2011.

*Primary Examiner* — Frank Lawrence
(74) *Attorney, Agent, or Firm* — Eric J. Schaal

(57) ABSTRACT

An adsorber vessel for the adsorption of gas contaminants from a gaseous stream comprising a vertical wall baffle positioned on an inner surface of an absorber vessel wall, and a bed support positioned below the vertical wall baffle and affixed to the inner surface of the adsorber vessel wall to support an adsorbent material, where the adsorbent material is interned by the bed support, the adsorber vessel wall, and the vertical wall baffle such that at least 90% of the volume created between the vertical wall baffle and the inner surface of the adsorber vessel is free of the adsorbent material.

16 Claims, 6 Drawing Sheets

(56) References Cited

U.S. PATENT DOCUMENTS

| | | | |
|---|---|---|---|
| 5,632,962 A | 5/1997 | Baker et al. | |
| 5,908,492 A | 6/1999 | Lehman et al. | |
| 6,070,653 A * | 6/2000 | Wingbro | 165/104.16 |

FOREIGN PATENT DOCUMENTS

| | | | |
|---|---|---|---|
| EP | 1133344 B1 | | 11/2002 |
| GB | 1459874 A | | 12/1976 |
| GB | 2020191 A | * | 11/1979 |
| JP | 51109283 | | 9/1976 |
| JP | 04161215 | | 6/1992 |
| JP | 04062094 | | 4/1994 |
| JP | 08019723 | | 1/1996 |
| JP | 09294928 | | 11/1997 |
| JP | 10267189 | | 10/1998 |
| JP | 2005058902 | | 3/2005 |

* cited by examiner

VERTICAL BAFFLE IN HORIZONTAL ADSORBER VESSELS

BACKGROUND

Air separation plants generally include adsorbers or adsorber vessels to remove contaminants such as carbon dioxide, water, hydrocarbons, etc. from the air before the air enters the air distillation plants. The classical adsorber design uses cylindrical vessels where the minimum cross section of the cylindrical adsorber vessel is determined by the maximum permissible flow rate of a rising gaseous stream (e.g., air). The cylindrical absorber vessel may be positioned vertically or horizontally based on the requirements for the vessel. For both vertical and horizontal adsorber configurations the maximum permissible flow rate of the rising gaseous stream is set by the fluidization (i.e., the velocity at which the feed gas may lift the adsorbent). This is especially true at the bed surface, and in the case of a horizontal vessel configuration, near the bed surface near the inner vessel wall.

As illustrated in FIG. 1A, traditional horizontal adsorbers 100 comprise a cylindrical vessel wall 102 that contains the adsorbent 104. The adsorbent 104 sits on top of an adsorbent bed support 116. The adsorbent has top surface layer of adsorbent 114 that extends along the width and length of the adsorber vessel 102. As illustrated in FIG. 1B, small "dunes" 108 begin to form on the surface layer of adsorbent 114 close to the vessel wall inner surface 106 as a result of the forces placed on the adsorbent by the rising gaseous streams through the adsorbent.

In traditional adsorber designs, and as illustrated in FIGS. 1A and 1B, the angle of the vessel wall inner surface 106 and the shape of the adsorbent 104, causes small spaces or voids 120 to be created near the vessel wall inner surface 106 where the adsorbent 104 is unable to fill. Rising gaseous streams looking for the path of least resistance, tend to flow through these small spaces or voids 120 along the vessel wall inner surface 106 rather than flowing through the more resistant sections filled with the adsorbent 104. Because the adsorbent 104 near the vessel wall inner surface 106 is not "caged" as well as the adsorbent 104 located near the center of the adsorber 100, and because the forces placed on the adsorbent 104 proximate to both the vessel wall inner surface 106 and the small spaces or voids 120 from the rising gaseous streams is more significant than the countering weight of the adsorbent 104, these small dunes 108 tend to form. As the adsorber is cycled from use to regeneration and back to use, small areas of adsorbent proximate to the dunes 108 and near the vessel wall inner surface 106 begin to move thereby causing fluidization. Fluidization is undesirable because it leads to adsorbent mixing, attrition of adsorbent, and dusting. As a result of the mixing, attrition and dusting, adsorbers will experience high pressure drop and loss of performance because of reduction in adsorbent diameter and reduction in adsorbent active surface area. Consequently the raw gas passes through the void regions 120 and 122 leading to earlier contaminant breakthrough. Fluidization along the vessel wall inner surface is dependent on the superficial velocity as higher superficial velocity means higher upward force under the adsorbent bed. When this upward force exceeds the adsorbent downward weight force fluidization occurs. As illustrated in FIG. 1C, at the widest point of the horizontal vessel, the wall angle or the angle ($\alpha$) between the tangent of the inner vessel wall (or plane A) and the horizontal plane B is approximately ninety (90°) degrees. At such point in the horizontal vessel, the flow is uniform. As the flow moves upward through the horizontal vessel, however, the wall angle or the angle ($\beta$) between the tangent of the inner vessel wall (or plane D) and the horizontal plane C decreases. The flow streamlines near the inner vessel wall start to converge while at the center of the horizontal vessel the streamlines remain uniform. This convergence of the streamlines at or near the vessel wall leads to higher flow velocities and hence earlier fluidization at or near the vessel wall. As the wall angle decreases the convergence of the streamlines further increases leading to higher velocities and fluidization in localized region 122.

To suppress fluidization, thereby limiting loss of performance of the adsorber, methods that replaced the top layer of the adsorbent with a layer of "heavy" adsorbent or support balls were developed and utilized. These methods, however, have a number of disadvantages. First, the heavy adsorbent or support balls add to the regeneration heating load of the adsorber, thus, requiring more power for regeneration. Second, the heavy adsorbent or support balls tend to migrate in the adsorber. To combat the migration of the heavy adsorbent or support balls, interlayer fine wire mesh screen may be used to stop such migration; however, introduction of the interlayer fine wire mesh screen in the adsorber itself presents further issues in that such screen does not fit perfectly flush with the near wall of the adsorber vessel. Thus, a small void area exists between the interlayer fine wire mesh screen and the near wall of the adsorber vessel. Such void areas may be as small as a few centimeters, for example, but such void area may be significant enough for adsorbent to enter these void areas. Once in these void areas, the adsorbent will begin to move and fluidization will occur. In fact, in such cases, the fluidization may cause the void areas to become larger creating further issues with the adsorber efficiency.

U.S. Pat. No. 4,353,716 to Rohde disclosed a process and apparatus for regenerating an adsorber. The disclosed apparatus included a bulkhead located in the zone of the vessel wall for separating the adsorbent arranged in the zone adjacent to the vessel wall from the remaining adsorbent in the vessel. The space between the vessel wall and the bulkhead was, however, filled with adsorbent material and a secondary feeding or discharge means for regenerating gas was also provided. The disclosed design attempted to improve regeneration purge near the vessel wall to ensure an optimum regeneration of the entire adsorbent that thereby reduced the cost of manufacturing and increases operating safety.

The bulkhead arrangement disclosed in U.S. Pat. No. 4,353,716 exhibited serious disadvantages. The small cross-sectional area created by the bulkhead and vessel wall leads to larger voids or empty space for the gas to flow through. Such increased voids can cause flow channeling which may actually enhance fluidization and dusting in the localized region. Thus, there is a need in the art for an improved adsorber process and apparatus design that prevents fluidization of the adsorbent in the adsorber thereby leading to more efficient performance of the adsorbers.

SUMMARY

The disclosed embodiments satisfy the need in the art by providing an improved adsorber process and design that incorporates a wall baffle/flow manipulator positioned in a horizontal or a vertical cross flow adsorber vessel to improve flow distribution, thus, enabling more flow through a given adsorber vessel without fluidizing the adsorbent. Such an exemplary arrangement may produce, for example, at least 10% more flow through the adsorber vessel without causing the onset of fluidization and subsequent dusting and contaminant breakthrough. Such exemplary embodiments may be utilized in both new vessels, enabling better adsorbent volume utilization and hence cost reduction, as well as in existing vessels to debottleneck adsorption processes for increased production. For example, the vertical baffle partially transforms the traditional horizontal adsorber vessel geometry into a traditional vertical adsorber vessel geometry. Hence the benefits of traditional vertical adsorber vessels such as increased effective on-stream time are transferred to the improved adsorber vessel. Utilization of vertical wall baffle also leads to improved regeneration due to reduced heat loss and subsequent improved radial temperature profiles. Further, utilization of vertical wall baffles leads to reduction or elimination of vessel insulation due to reduced heat loss.

In one embodiment an adsorber vessel for the adsorption of gas contaminants from a gaseous stream is disclosed comprising a vertical wall baffle positioned on an inner surface of an absorber vessel wall and a bed support positioned below the vertical wall baffle and affixed to the inner surface of the adsorber vessel wall to support an adsorbent material, where the adsorbent material is interned by the bed support, the adsorber vessel wall, and the vertical wall baffle such that at least 90% of the volume created between the vertical wall baffle and the inner surface of the adsorber vessel is a gas.

In another embodiment an apparatus for the adsorption of gas contaminants from a gaseous stream comprising a vessel having a vessel wall, the vessel wall including an inner surface, a bed of adsorbent material having a top surface and being positioned atop a bed support and a baffle located within the vessel and above the bed support, the baffle including an upper portion having an upper end and a lower portion having a lower end, the lower end being positioned against the inner surface of the vessel wall, at least a portion of the baffle being spaced apart from the inner wall surface, thereby defining a void area between the baffle and the inner wall surface, the upper portion extending above the top surface of the bed of adsorbent material, the lower portion being submerged in the bed of adsorbent material and being adapted to prevent air or adsorbent material from flowing into the void area through the baffle or between the lower end of baffle and the inner wall surface.

BRIEF DESCRIPTION OF SEVERAL VIEWS OF THE DRAWINGS

The foregoing summary, as well as the following detailed description of exemplary embodiments, is better understood when read in conjunction with the appended drawings. For the purpose of illustrating embodiments, there is shown in the drawings exemplary constructions; however, the invention is not limited to the specific methods and instrumentalities disclosed. In the drawings.

DETAILED DESCRIPTION

Figure 2A:
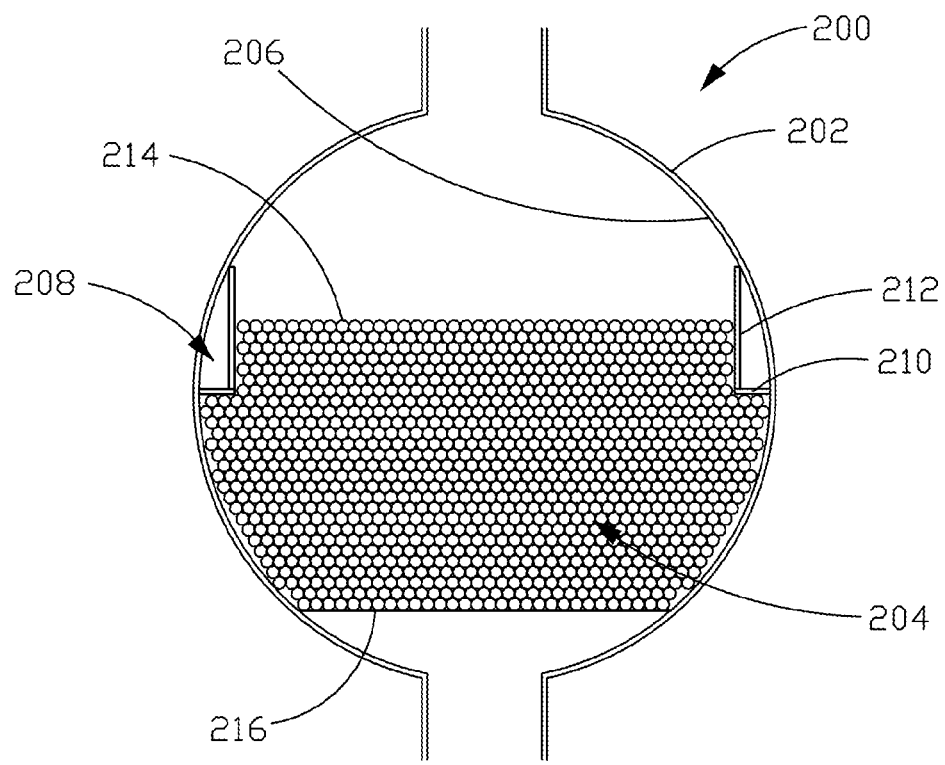
FIG. 2A is a cross-sectional view of the improved adsorber in accordance with one embodiment of the present invention.
Figure 2B:
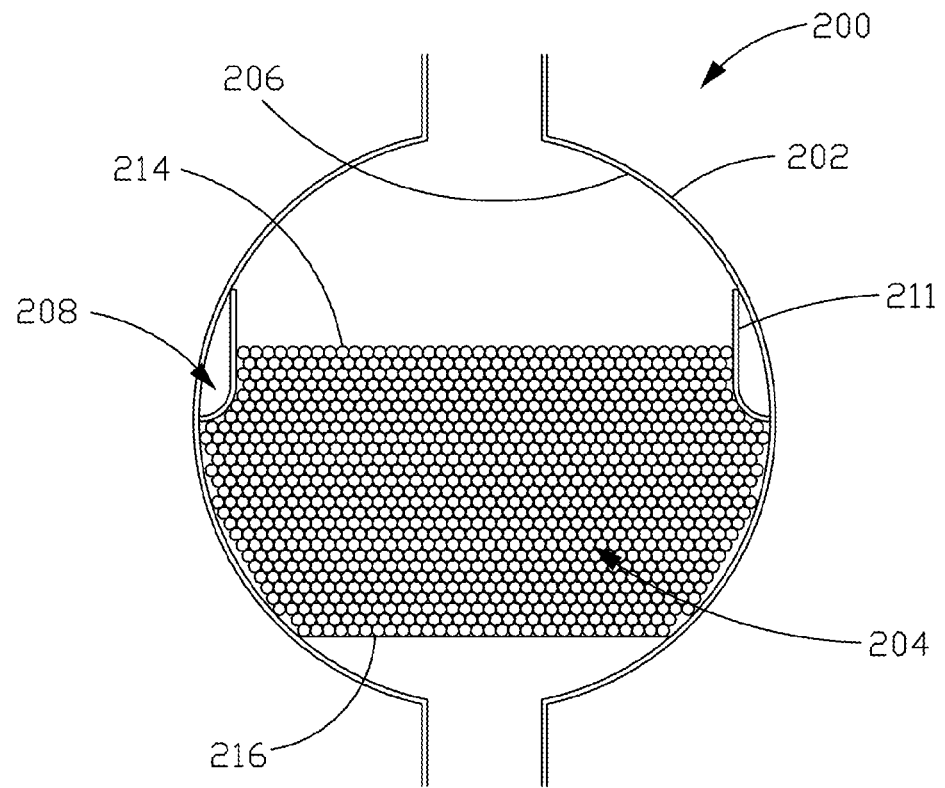
FIG. 2B is an alternative cross-sectional view of the improved adsorber in accordance with one embodiment of the present invention
Figure 3:
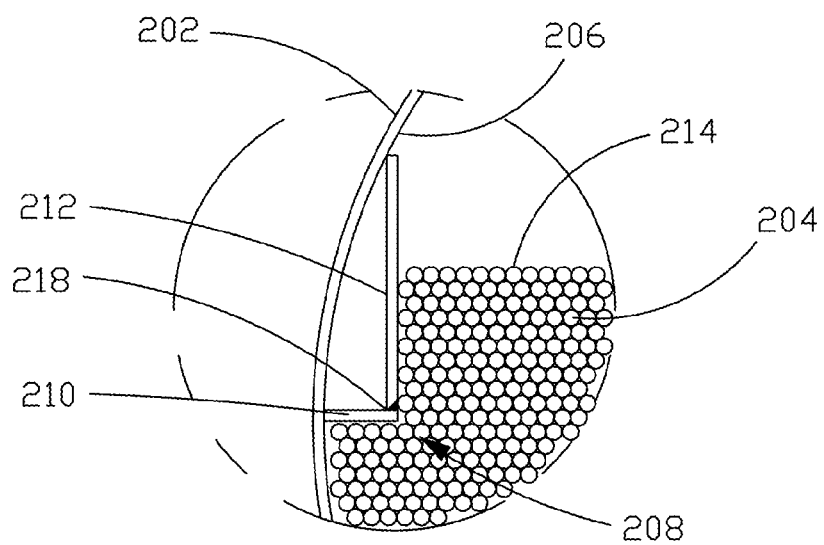
FIG. 3 is a close-up view of the improved adsorber of FIG. 2A in accordance with one embodiment of the present invention.
Figure 4:
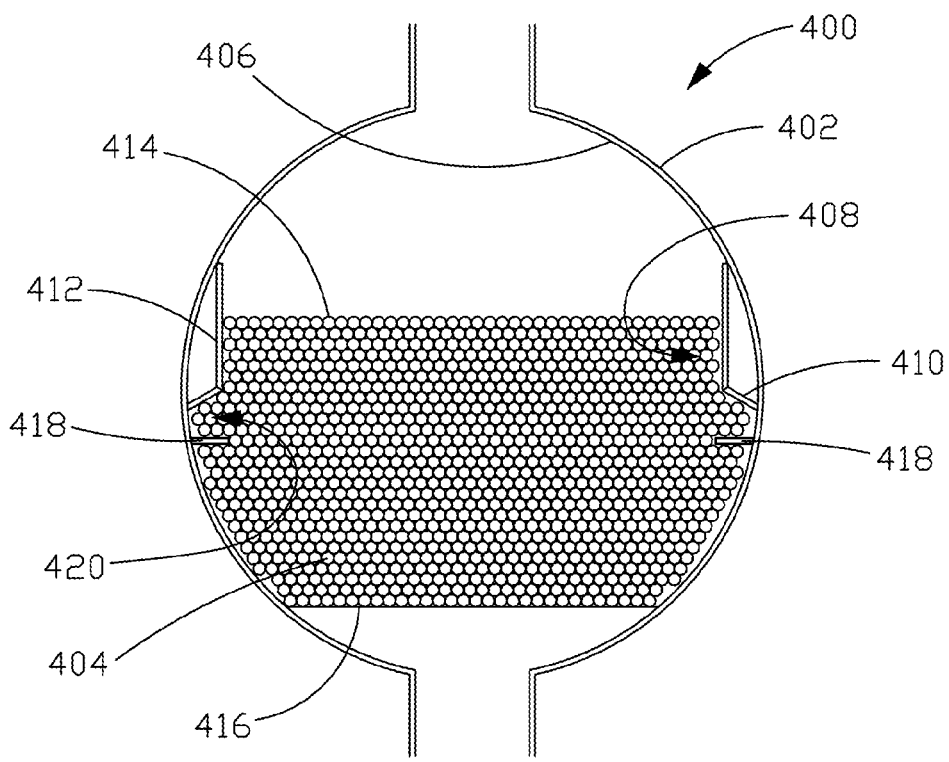
FIG. 4 is a cross-sectional view of an alternative improved adsorber in accordance with one embodiment of the present invention.

As illustrated in FIG. 2A, one embodiment of the current invention includes an adsorber 200 that incorporates a vertical baffle 208 in the adsorber vessel 200 to increase the raw gas flow rate through the vessel without causing fluidization. The vertical baffle 208 incorporated in the adsorber vessel 200 comprises a vertical portion or plate 212 affixed to a horizontal or semi inclined horizontal portion or plate 210. The vertical portion or plate 212 may be welded, for example, or affixed to the horizontal or semi inclined horizontal portion or plate 210 using any other suitable means for affixing similar materials together. In the interest of brevity, the traditional means of welding shall be referred to hereinafter, however, nothing shall limit the disclosure to welding only. The vertical baffle 208 may also be a single plate 211 that has been bent or otherwise moulded into a curved shape, for example, as illustrated in FIG. 2B. Referring to FIG. 2A, the vertical plate 212 rests against the inner surface of the vessel wall 206 and may be sealed with high temperature silicon adhesive, for example, or simply left unsealed. In preferred embodiments, the vertical plate 212 is not sealed against the vessel wall inner surface 206. Drain holes (not shown) may be incorporated in the horizontal or semi inclined horizontal plate 210 to allow for drainage of any water, for example, that may accumulate during the adsorber vessel's hydrostatic testing. The drain holes may measure approximately six (6) millimeters in diameter, for example. Post any hydrostatic testing, the drain holes may then be plugged with screwed plugs, plug welds, a seal welded plate, elastomeric sealant (e.g. silicon), or other sealant means, for example, to avoid a bypass of process gas. Any process gas leaking through the baffle drain holes may bypass the section of adsorbent bed 200 contained within the depth of the vertical baffle 208 leading to premature breakthrough of contaminants in the adsorber vessel 200, the same contaminants the adsorber vessel 200 is intended to remove. The corners 218 of the vertical baffle 208 may be rounded or a square edge. The horizontal or semi inclined horizontal plate 210 may be 25 mm thick and 75 mm deep, for example. The angle between the vertical plate 212 and the horizontal or semi inclined horizontal plate 210 may be ninety degrees (90°), for example, as illustrated in FIGS. 2 and 3. The angle between the vertical plate 212 and the horizontal or semi inclined horizontal plate 210 may be less than ninety degrees (90°) (not shown) or greater than ninety degrees (90°) as illustrated in FIG. 4. For example, the adsorber vessel 200 may include a horizontal plate 210 and a vertical plate 212 where the angle between said plates is greater than ninety degrees (90°). Further, the adsorber vessel 200 may include a horizontal plate 210 and a vertical plate 212 where the angle between said plates is less than ninety degrees (90°).

Vertical plate 212 is affixed (e.g., welded) to the horizontal or semi inclined horizontal plate 210. The weld may be a full or partial penetration or fillet welded, for example. The horizontal or semi inclined horizontal plate 210 is then affixed (e.g., welded) to the vessel wall inner surface 206. Other types of welds or suitable methods for affixing the vertical plate 212 to the horizontal or semi inclined horizontal plate 210 or the horizontal or semi inclined horizontal plate 210 to the vessel wall inner surface 206 may also be used.

As stated previously, the vertical wall baffle 208 is positioned such that the top of the vertical plate 212 rests against the inner surface of the vessel wall 206 as illustrated in FIGS. 2 and 3. The adsorbent material 204, thus, is interned, supported, or contained by the adsorbent bed support or bed support 216, the adsorber vessel wall and specifically the adsorbent vessel wall inner surface 206, and the vertical wall baffle 208. The void, volume, or space created between the vertical wall baffle 208 and the adsorbent vessel wall inner surface 206 is open and remains substantially free of any adsorbent material 204. Some very small particulate adsorbent material 204 may enter this volume as a result of the vertical wall baffle 208 being positioned such that the top of the vertical plate 212 only rests against the vessel wall inner surface 206, however, the volume should at least be 90% free of adsorbent and may be filled with gas, an insulation material (e.g., cellular glass, mineral wool, silicon, perlite concrete, etc.) or a non-adsorbent material (concrete, etc.).

At the dished ends of the adsorber vessel 200 an additional horizontal plate or capping plate (not shown) may be added to the vertical wall baffle 208 to bridge the gap between the vertical plate 212 and the vessel wall inner surface 206 because the profile of the dished end wall of the adsorber vessel 200 is not constant and varies along the dished end. This horizontal or capping plate rests against the vessel wall inner surface 206 like the vertical plate 212 rests against the vessel wall inner surface 206 as illustrated in FIGS. 2 and 3. While the horizontal or capping plate is optional, the horizontal or capping plate does provide additional support for the upper edge of the vertical plate 212 and also helps keep adsorbent 204 from entering the area behind the vertical wall baffle 208 during loading, for example. The vertical plates 212 may be fitted around the entire internal circumference of the adsorber vessel 200 or just along the cylindrical length of the adsorber vessel 200, for example. Alternatively, the "curved" baffle illustrated in FIG. 2B may be utilized along the cylindrical length of the adsorber vessel 200 while the baffle illustrated in FIG. 2A may be used in the dished ends of the adsorber vessel 200.

The vertical wall baffle 208 is preferably positioned so that a portion of the vertical plate 212 is covered on one side by the adsorbent 204 and a portion of the vertical plate 212 extends upwardly beyond the surface 214 of the adsorbent 204. As explained above, it is preferable that the vertical wall baffle 208 be configured to prevent gas from passing through the vertical wall baffle 208 in a manner that enables the gas to bypass a section of the bed of adsorbent material 204. Accordingly, the portion of the vertical wall baffle 208 that is submerged in (or covered by) the bed of adsorbent material 204 and the joint between the horizontal plate 210 and the inner surface of the vessel wall 206 are preferably substantially impermeable to gas within the range of gas pressures at which the adsorber 200 is designed to be operated.

Figure 1A:
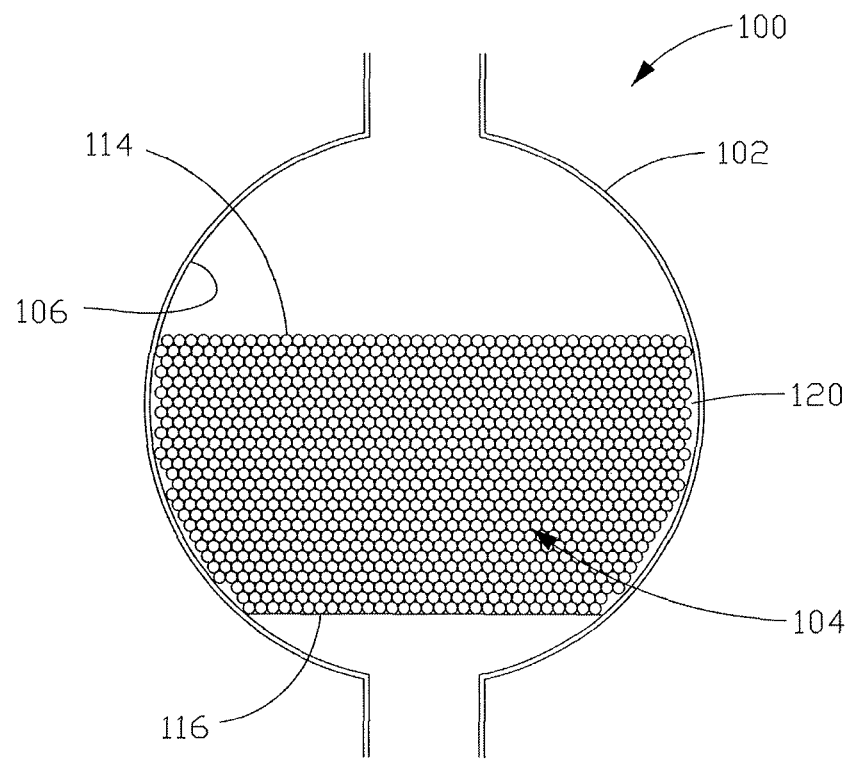
FIG. 1A is a cross-sectional view of a traditional adsorber.
Figure 1B:
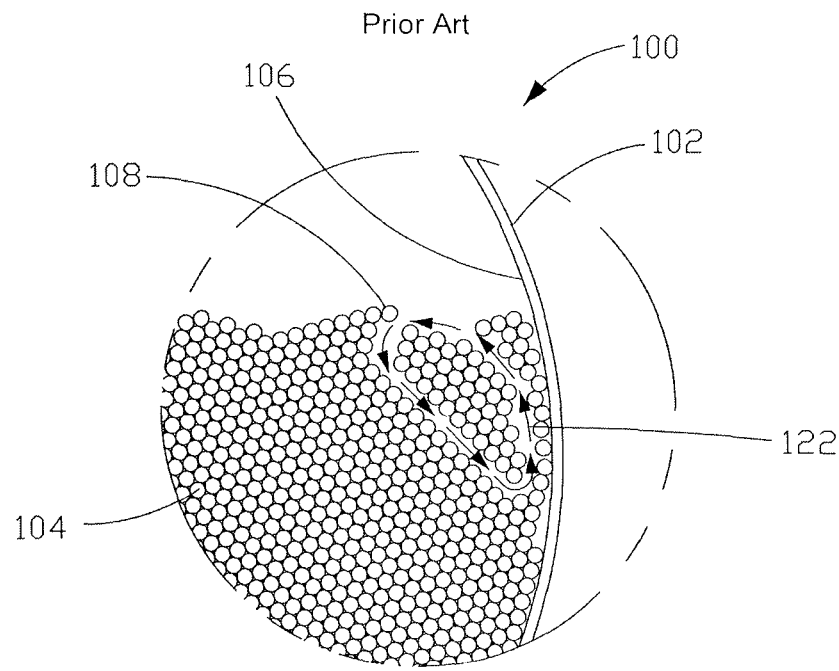
FIG. 1B is close-up view illustrating fluidization occurring in the traditional adsorber of FIG. 1A.
Figure 1C:
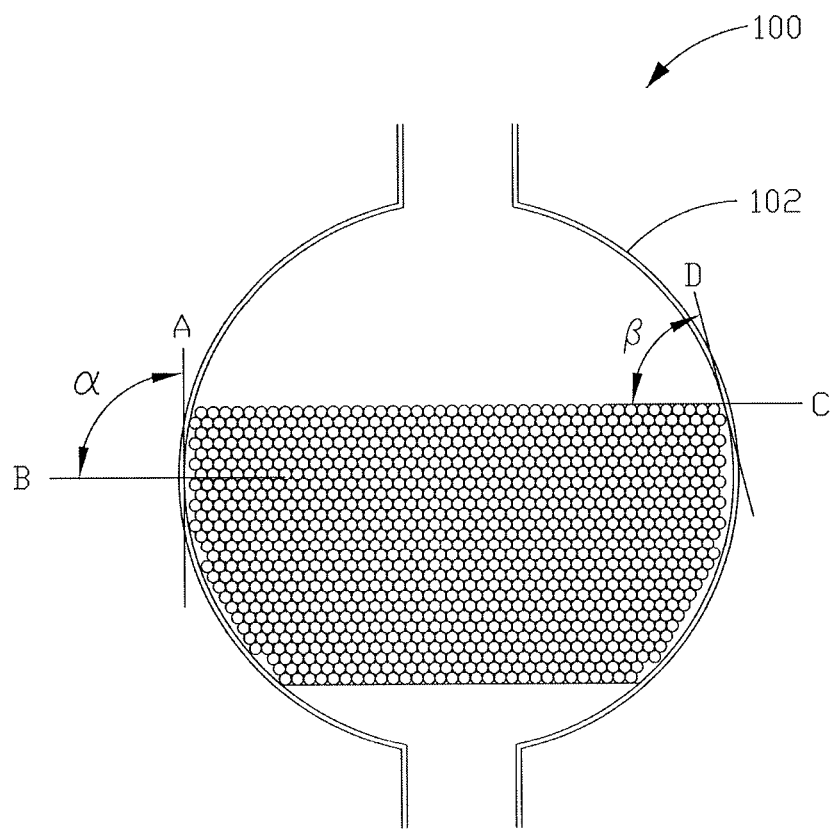
FIG. 1C is a cross-sectional view of a traditional adsorber illustrating the wall angle.

The vertical wall baffle 208 prevents the rising gaseous streams (e.g., air) from flowing freely through the small spaces or voids 120 (as illustrated in FIGS. 1A and 1B) near the vessel wall of the adsorber 200. The vertical wall baffle 208 also alters the flow and velocity profiles of the rising gaseous streams close to the vessel wall inner surface 206. The vertical wall baffle 208 forces the rising gaseous streams away from the vessel wall inner surface 206 and more toward the center of the adsorbent bed. Use of the vertical wall baffle 208 also increases the average velocity of the rising gaseous streams moving past the vertical plate 212. As a result of the positioning of the vertical wall baffle 208, the localised high velocity zones close to the adsorber vessel walls 206 are moved vertically lower down the adsorber vessel 200 and horizontally further away from the adsorber vessel wall 206. This enables the flow of the rising gaseous streams to evenly distribute as it exits the adsorbent 204, hence reducing the risk of fluidization that enables more flow through the adsorber vessel 200. The localised high velocity zone where the horizontal or semi inclined horizontal plate 210 and vertical plate 212 meet can be minimised by using a rounded edge as opposed to a square edge and/or increasing the angle of the join between the horizontal or semi inclined horizontal plate 210 and the vertical plate 212. Finally, incorporation of the vertical wall baffle 208, in some instances, eliminates the angles of the vessel wall inner surface 206 that promote the small space or voids 120 to promulgate.

In one alternative embodiment, and as illustrated in FIG. 4, an additional horizontal or semi inclined horizontal plate 418 may be incorporated below the vertical wall baffle 408 to further disrupt fluidization in the adsorber 400. A small space 420 filled with adsorbent 404 may be positioned between the additional horizontal or semi inclined horizontal plate 418 and the vertical wall baffle 408.

Figure 5:
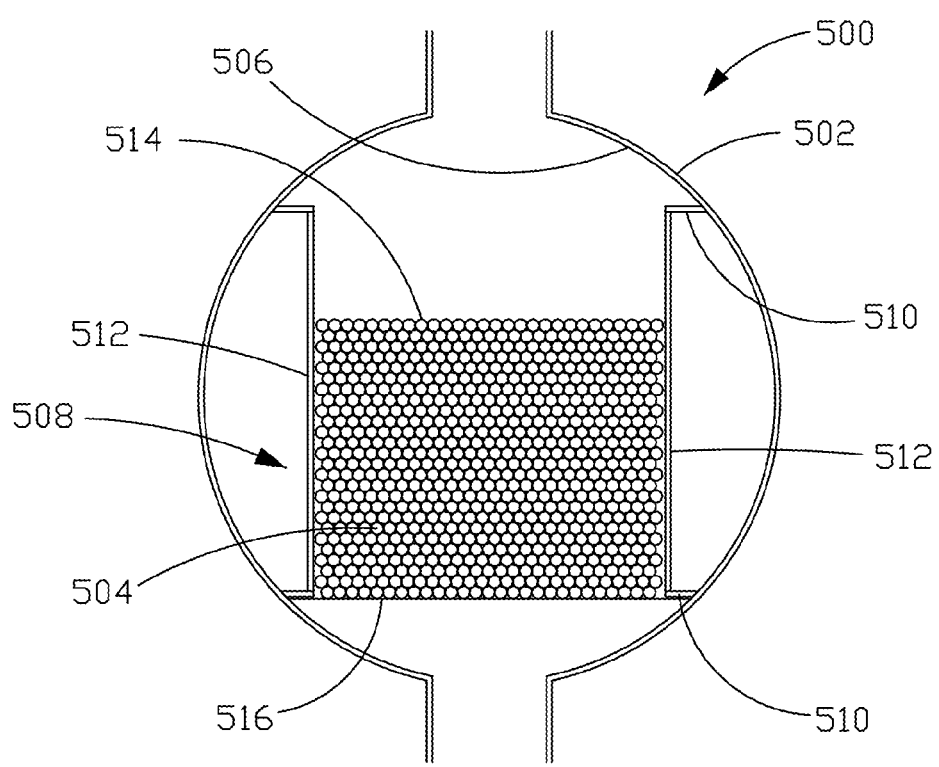
FIG. 5 is a cross-sectional view of an alternative improved adsorber in accordance with one embodiment of the present invention.

In an alternative embodiment, a vertical wall baffle 508 may be affixed (e.g., welded) to the adsorbent bed support 516 as illustrated in FIG. 5. When the vertical wall baffle 508 is welded to the adsorbent bed support 516, the region of the adsorbent bed support 516 between the adsorber vessel wall 506 and the vertical plate 512 is a non-perforated material to prevent flow of the rising gaseous streams through the vertical wall baffle 508. A horizontal plate 510, for example, may be used to prevent such flow.

To combat the drawbacks of using a horizontal vessel configuration, including, but not limited to, uneven feed flow distribution, limitation of the maximum flow that can be processed through a given system, fluidization, adsorbent dusting, and contaminant leakage, the use of a vertical wall baffle 208, 408, 508 acts as flow straightener to even out the feed flow distribution in the adsorber vessel 200, 400, 500 minimizing near wall flow bypassing and hence the onset of fluidization at the bed surface. The vertical wall baffle 208, 408, 508, during the reactivation stage of the adsorption process, also acts as a thermal insulating sleeve to the near wall adsorbents. This enables even temperature profiles across the entire width of the adsorber vessel 200, 400, 500 during the reactivation stage leading to a more square regeneration peak and heater power savings.

In a typical Temperature Swing Adsorption (TSA) Vessel design, for example, the vertical wall baffle, adsorption vessel walls, and any support screen will experience varying temperatures and pressures throughout its cyclic operation. Thus, embodiments of the current invention contemplate only resting the vertical wall baffle 208, 408, 508 against the vessel wall inner surface 206, 406, 506 to allow for the free movement of gas for pressure equalization purposes, thus, eliminating any creation of a closed volume between the vertical wall baffle 208, 408, 508 and the vessel wall inner surface 206, 406, 506. In another embodiment, the vertical wall baffle 208, 408, 508 may be positioned a small distance from the vessel wall inner surface 206, 406, 506.

The top of the vertical wall baffle 208, 408, 508 is positioned above the adsorbent surface 214, 414, 514 by approximately 0-100 mm, and preferably 25 mm above the adsorbent surface 214, 414, 514. The bottom of the vertical baffle is submerged in the adsorbent.

Reference numerals of some elements of adsorbers 400 and 500 that are also present in adsorber 200 that are not specifically discussed in the specification are, in the interests of clarity, included in FIGS. 4 and 5. Such elements will have reference numbers that are increased by 200 or 300, respectively. For example, the bed support is identified by reference numeral 216 in reference to adsorber 200. Reference numerals 416 and 516 refer to a bed support of adsorbers 400 and 500, respectfully.

Embodiments of the current invention may be used in any horizontal adsorber vessel. Embodiments of the current invention may also be used to provide a more uniform flow distribution. The vertical wall baffle technology may be applied to any adsorption system regardless of the pressures, temperatures, adsorbents, or adsorbates used.

Table 1 lists the process boundaries for an exemplary air separation system utilizing an adsorber design.

TABLE 1

|  | Preferred Range | Most preferred range |
|---|---|---|
| Feed Pressure | 3 bara to 40 bara | 5 bara to 15 bara |
| Air Feed Temperature | 5° C. to 60° C. | 10° C. to 30° C. |
| Purge Temperature | 5° C. to 500° C. | 10° C. to 300° C. |
| Feed $CO_2$ | 100 ppm to 2000 ppm | 300 ppm to 600 ppm |
| Purge Pressure | 0.3 bara to 20 bara | 1.05 bara to 3 bara |

Figure 6:
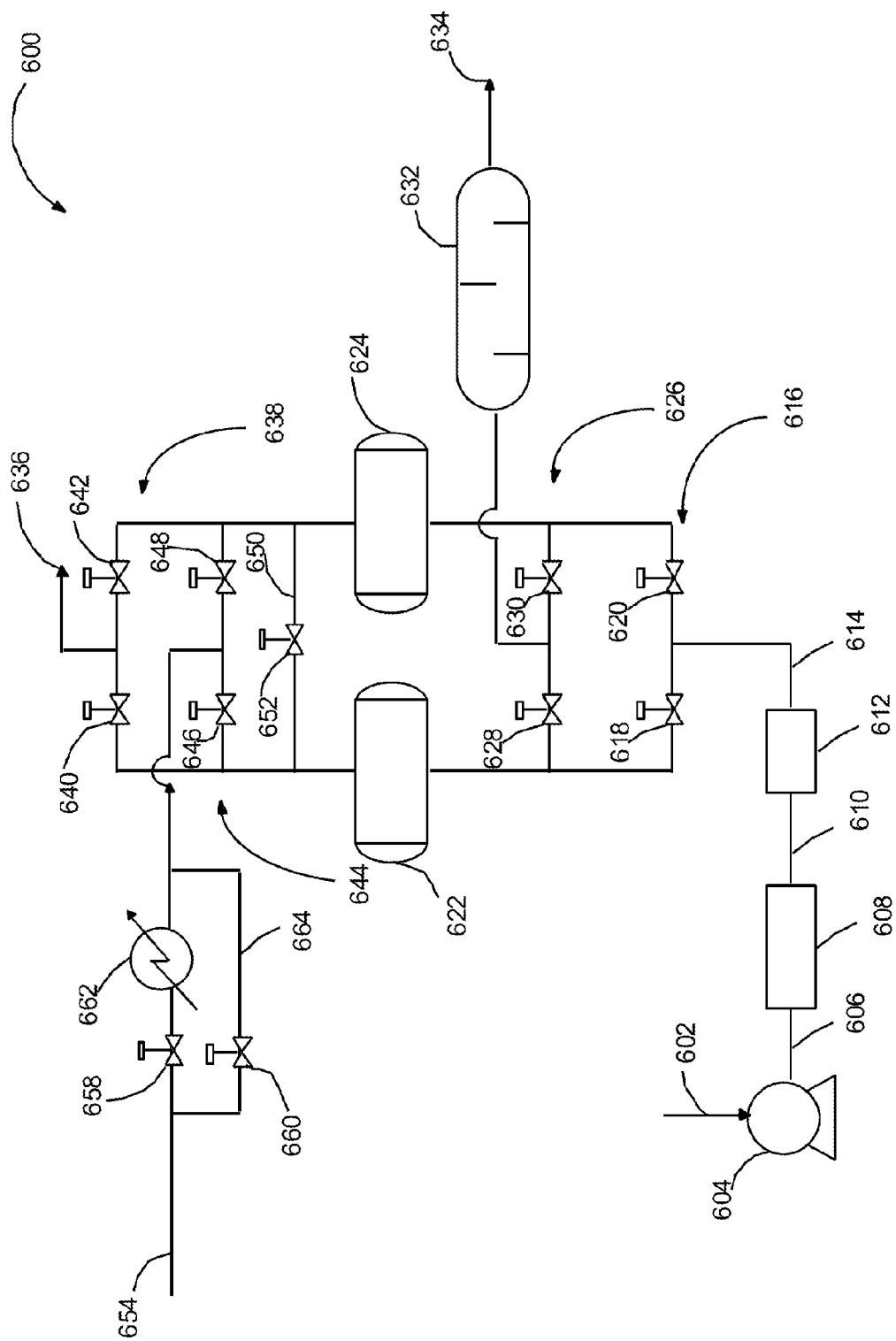
FIG. 6 is a flow diagram of an exemplary adsorbent system utilizing the adsorber vessel comprising the improved adsorber in accordance with the present invention.

The vertical wall baffles 208, 408, 508 as illustrated in FIGS. 2-5 may be employed in the exemplary adsorbent system 600 illustrated in FIG. 6. As illustrated in FIG. 6, an air feed 602 to be purified is fed to a main air compressor (MAC) 604 where the air feed may be compressed in multiple stages. Intercoolers and aftercoolers (not shown) may also be employed in conjunction with the main air compressor 604. A cooler 608 may be fluidly connected to the main air compressor 604 via line 606 to condense at least some of the water vapor from the cooled compressed air exiting the main air compressor 604. A separator 612 fluidly connected to the cooler 608 via line 610 removes water droplets from the compressed cooled air exiting the cooler 608.

The separator 612 is fluidly connected to an inlet manifold 616, containing inlet control valves 618 and 620 via line 614. The inlet manifold 616 is fluidly connected to a pair of adsorber vessels 622, 624. The inlet manifold 616 is bridged downstream of the control valves 618 and 620 by a venting manifold 626 containing venting valves 628 and 630, which serve to close and open connections between the upstream end of respective adsorber vessels 622 and 624 and a vent 634 via a silencer 632. Each of the two adsorber vessels 622 and 624 comprise an adsorbent bed preferably comprising multi-layered adsorbents (not shown). The upstream portion of the adsorbent beds contain an adsorbent for removing water, for example, activated alumina or modified alumina, and the downstream portion of the adsorption beds, contains adsorbent for the removal of carbon dioxide, for example, zeolite, for removing $CO_2$, $N_2O$, and residual water and hydrocarbons.

The exemplary adsorbent system 600 has an outlet 636 connected to the downstream ends of the two adsorber vessels 622 and 624 by an outlet manifold 638 containing outlet controls valves 640 and 642. Outlet 636 is fluidly connected to a downstream processing apparatus, for example, a cryogenic air separator (not shown). The outlet manifold 638 is bridged by a regenerating gas manifold 644 containing regenerating gas control valves 646 and 648. Upstream from the regenerating gas manifold 644, a line 650 containing a control valve 652 also bridges across the outlet manifold 638.

An inlet for regenerating gas is provided at 654 which, through control valves 658 and 660, is connected to pass either through a heater 662 or via a by-pass line 664 to the regenerating gas manifold 644. The regeneration gas is suitably obtained from the downstream processing apparatus fed by outlet 636.

In operation, the air feed 602 to be purified is fed to a main air compressor 604 where it is compressed, for example, in multiple stages. The air feed 602 may be further cooled through the use of intercoolers and aftercoolers (not shown) that heat exchange with water, for example. The compressed air feed in line 606, optionally, may then be sub-cooled in cooler 608 so as to condense at least some of the water vapor from the cooled compressed air. The compressed cooled air in line 610 is then fed to a separator 612 that removes water droplets from the compressed cooled air in line 610. The dry air feed in line 614 is then fed to the inlet manifold 616 where it passes through one of the two adsorber vessels 622, 624 containing adsorbent. Starting from a position in which air is passing through open valve 618 to adsorber vessel 622, and through open valve 640 to the outlet 636, valve 620 in the inlet manifold 616 will just have been closed to cut-off adsorber vessel 624 from the dry air feed of line 614 for purification. Valve 642 will be closed also.

At this stage, valves 646, 648, 652, 628, and 630 are all closed. Adsorber vessel 622 is on-line and adsorber vessel 624 is to be regenerated.

To regenerate adsorber vessel 624, the adsorber vessel 624 is first depressurized by opening valve 630. Once the pressure in the adsorber vessel 624 has fallen to a desired level, valve 630 is kept open whilst valve 648 is opened to commence a flow of regenerating gas. The regenerating gas will typically be a flow of nitrogen that is dry and free of carbon dioxide obtained from the air separation unit cold box (not shown), possibly containing argon, oxygen and other gases, to which the air purified in the apparatus shown is passed. Valve 660 is closed and valve 658 is opened so that the regenerating gas is heated to a temperature of, for example, 100° C. before passing into the vessel 624. Although the regenerating gas enters the adsorber vessel 624 at the selected elevated temperature, it is very slightly cooled by giving up heat to desorb carbon dioxide from the upper portion of the adsorbent in the adsorber vessel 624 and further cooled, by giving up heat to desorb water, in the lower portion of the adsorber vessel 624. The molecular sieve of the adsorber vessels 622, 624 may be any one of those known for this purpose in the art, for example, CaX, NaY zeolite, 4A zeolite, or 13× zeolite, for example. One may employ a single adsorbent of the kind described in, for example, U.S. Pat. No. 5,779,767, by Golden et al. (i.e., an absorbent comprising a mixture of zeolite and alumina), for example.

While the apparatus, system, and process disclosed herein focuses on use in vessel internals that are preferably used in horizontal adsorber vessel geometries, nothing contained herein limits the apparatus, systems, and processes to such use. For example, it is equally suitable to be employed in a vertical vessel cross flow arrangement or catalytic reactor vessel.

EXAMPLES

A large industrial scale horizontal adsorber vessel was modeled through the use of computational fluid dynamics (CFD). The dimensions of the modeled vessel are listed in Table 2. CFD simulations were performed on the traditional horizontal adsorber vessel without a vertical baffle (Case 1) and with a vertical baffle (Case 2). The results are listed in Table 2.

TABLE 2

|  | Case 1 Without Vertical Wall Baffle | Case 2 With Vertical Wall Baffle |
| --- | --- | --- |
| Flow rate | 213000 Kg/hr | 234300 Kg/hr |
| Pressure | 5 bara | 5 bara |
| Temperature | 11° C. | 11° C. |
| Vessel tan-tan | 5500 mm | 5500 mm |
| Vessel Diameter | 4000 mm | 4000 mm |

As illustrated in Table 2, Applicants found, with surprising result, that the inclusion of a vertical wall baffle allowed for approximately 10% more gas (air) flow to be processed by the adsorber before a similar velocity or flow rate at the bed surface near the inner wall was observed. As previously noted, as the velocity or flow rate increases, the likelihood of the onset of fluidization increases. The presence of the vertical baffle allows more gas flow to pass through the adsorber without an increase in the velocity or flow rate and hence risk of the onset of fluidization. It should be noted that other variations of vertical baffle design exist, as discussed herein and shown in the various figures, which result in improved gas flow of different percentage values to the above quoted percentage.

While aspects of the present invention have been described in connection with the preferred embodiments of the various figures, it is to be understood that other similar embodiments may be used or modifications and additions may be made to the described embodiment for performing the same function of the present invention without deviating therefrom. The claimed invention, therefore, should not be limited to any single embodiment, but rather should be construed in breadth and scope in accordance with the appended claims. For example, the following aspects should also be understood to be a part of this disclosure:

Aspect 1. An adsorber vessel for the adsorption of gas contaminants from a gaseous stream comprising: a vertical wall baffle positioned on an inner surface of an absorber vessel wall; and a bed support positioned below the vertical wall baffle and affixed to the inner surface of the adsorber vessel wall to support an adsorbent material, wherein the adsorbent material is interned by at least the bed support and the vertical wall baffle such that at least 90% of the volume created between the vertical wall baffle and the inner surface of the adsorber vessel is free of adsorbent material.

Aspect 2. The adsorber vessel of Aspect 1, wherein the vertical wall baffle comprises a first section having a first end and a second end, wherein the first end of the first section is affixed along the periphery of the inner surface of the adsorber vessel wall and wherein the second end of the first section extends outwardly from the periphery of the inner surface of the adsorber vessel wall; and a second section having a first end and a second end, wherein the first end of the second section is affixed proximate to the second end of the first section, and wherein the second end of the second section extends vertically upward in the adsorber vessel such that the second end of the second section is in a spaced relationship with a portion of the inner surface of the adsorber vessel wall above the second section creating a volume between the vertical wall baffle and the inner surface of the adsorber vessel wall.

Aspect 3. The adsorber vessel of Aspect 2, wherein the angle between the first section and the second section is greater than or equal to 90 degrees.

Aspect 4. The adsorber vessel of Aspect 2, wherein the angle between the first section and the second section is less than or equal to 90 degrees.

Aspect 5. The adsorber vessel of any one of Aspects 2-4, further comprising a third section having a first end and a second end, wherein the first end of the third section is affixed along the periphery of the inner surface of the adsorber vessel wall below the first section, and wherein the second end of the third section extends outwardly from the periphery of the inner surface of the adsorber vessel wall.

Aspect 6. The adsorber vessel of any one of Aspects 2-5, further comprising a capping plate having a first end and a second end, wherein the first end of the capping plate is affixed to the second end of the second section of the vertical wall baffle and the second end of the capping plate extends towards the inner surface of the adsorber vessel wall such that the second end of the capping plate is in a spaced relationship with a portion of the inner surface of the adsorber vessel wall.

Aspect 7. The adsorber vessel of any one of Aspects 2-6, wherein the first section of the vertical wall baffle is composed of a non-perforated material, and wherein the first section of the vertical wall baffle contacts the bed support.

Aspect 8. The adsorber vessel of any one of Aspects 2-7, wherein the second end of the second section of the vertical wall baffle is positioned above the top surface of the adsorbent material volume.

Aspect 9. The adsorber vessel of any one of Aspects 2-7, wherein the second end of the second section of the vertical wall baffle is at least 25 mm above the top surface of the adsorbent material volume.

Aspect 10. The adsorber vessel of any one of Aspects 2-9 or 11, wherein the volume created between the vertical wall baffle and the inner surface of the adsorber vessel is filled with a gas, an insulation material, or a non-adsorbent material.

Aspect 11. The adsorber vessel of Aspect 1, wherein the vertical wall baffle is curved such that a first end of the vertical wall baffle extends horizontally and is affixed along the periphery of the inner surface of the adsorber vessel wall and a second end of the vertical wall baffle extends vertically upward in the adsorber vessel such that the second end is in a spaced relationship with a portion of the inner surface of the adsorber vessel wall above the second end of the vertical wall baffle creating a volume between the vertical wall baffle and the inner surface of the adsorber vessel wall.

Aspect 12. The adsorber vessel of Aspect 11, wherein the second end of the vertical wall baffle is positioned at or above the top surface of the adsorbent material volume.

Aspect 13. The adsorber vessel of Aspect 11, wherein the second end of the vertical wall baffle is at least 25 mm above the top surface of the adsorbent material volume.

Aspect 14. An apparatus for the adsorption of gas contaminants from a gaseous stream comprising:

a vessel having a vessel wall, the vessel wall including an inner surface;

a bed of adsorbent material having a top surface and being positioned atop a bed support; and a baffle located within the vessel and above the bed support, the baffle including an upper portion having an upper end and a lower portion having a lower end, the lower end being positioned against the inner surface of the vessel wall, at least a portion of the baffle being spaced apart from the inner wall surface, thereby defining a void area between the baffle and the inner wall surface, the upper portion extending above the top surface of the bed of adsorbent material, the lower portion being submerged in the bed of adsorbent material and being adapted to prevent air or adsorbent material from flowing into the void area through the baffle or between the lower end of baffle and the inner wall surface.

Aspect 15. The apparatus of Aspect 14, wherein the upper end of the baffle is positioned proximate to the inner surface of the vessel wall.

Aspect 16. The apparatus of Aspect 14 or 15, wherein the vessel wall has a circumference and the baffle substantially extends around the circumference of the vessel wall.

Aspect 17. The apparatus of any one of Aspects 14-16, wherein the void area is substantially free of the adsorbent material.

The invention claimed is:

1. An adsorber vessel for the adsorption of gas contaminants from a gaseous stream comprising:
a vertical wall baffle positioned on an inner surface of an adsorber vessel wall, wherein the vertical wall baffle comprises a first section having a first end and a second end, wherein the first end of the first section is affixed along the periphery of the inner surface of the adsorber vessel wall and wherein the second end of the first section extends outwardly from the periphery of the inner surface of the adsorber vessel wall; and a second section having first end and a second end, wherein the first end of the second section is affixed proximate to the second end of the first section, and wherein the second end of the second section extends vertically upward in the adsorber vessel such that the second end of the second section is in a spaced relationship with a portion of the inner surface of the adsorber vessel wall above the second section creating a volume between the vertical wall baffle and the inner surface of the adsorber vessel wall; and
a bed support positioned spatially apart from and below the vertical wall baffle and affixed to the inner surface of the adsorber vessel wall to support an adsorbent material, wherein the adsorbent material is interned by at least the bed support and the vertical wall baffle such that at least 90% of the volume created between the vertical wall baffle and the inner surface of the adsorber vessel is free of adsorbent material.

2. The adsorber vessel of claim 1, wherein the angle between the first section and the second section is greater than or equal to 90 degrees.

3. The adsorber vessel of claim 1, wherein the angle between the first section and the second section is less than or equal to 90 degrees.

4. The adsorber vessel of claim 1, further comprising a third section having a first end and a second end, wherein the first end of the third section is affixed along the periphery of the inner surface of the adsorber vessel wall below the first section, and wherein the second end of the third section extends outwardly from the periphery of the inner surface of the adsorber vessel wall.

5. The adsorber vessel of claim 1, further comprising a capping plate having a first end and a second end, wherein the first end of the capping plate is affixed to the second end of the second section of the vertical wall baffle and the second end of the capping plate extends towards the inner surface of the adsorber vessel wall such that the second end of the capping plate is in a spaced relationship with a portion of the inner surface of the adsorber vessel wall.

6. The adsorber vessel of claim 1, wherein the first section of the vertical wall baffle is composed of a non-perforated material, and wherein the first section of the vertical wall baffle contacts the bed support.

7. The adsorber vessel of claim 1, wherein the second end of the second section of the vertical wall baffle is positioned above the top surface of the adsorbent material volume.

8. The adsorber vessel of claim 7, wherein the second end of the second section of the vertical wall baffle is at least 25 mm above the top surface of the adsorbent material volume.

9. The adsorber vessel of claim 1, wherein the volume created between the vertical wall baffle and the inner surface of the adsorber vessel is filled with a gas, an insulation material, or a non-adsorbent material.

10. The adsorber vessel of claim 1, wherein the vertical wall baffle is curved such that a first end of the vertical wall baffle extends horizontally and is affixed along the periphery of the inner surface of the adsorber vessel wall and a second end of the vertical wall baffle extends vertically upward in the adsorber vessel such that the second end is in a spaced relationship with a portion of the inner surface of the adsorber vessel wall above the second end of the vertical wall baffle creating a volume between the vertical wall baffle and the inner surface of the adsorber vessel wall.

11. The adsorber vessel of claim 10, wherein the second end of the vertical wall baffle is positioned at or above the top surface of the adsorbent material volume.

12. The adsorber vessel of claim 10, wherein the second end of the vertical wall baffle is at least 25 mm above the top surface of the adsorbent material volume.

13. An apparatus for the adsorption of gas contaminants from a gaseous stream comprising:
a vessel having a vessel wall, the vessel wall including an inner surface;
a bed of adsorbent material having a top surface and being positioned atop a bed support; and
a vertical wall baffle located within the vessel and positioned spatially apart from and above the bed support, the vertical wall baffle including an upper portion having an upper end and a lower portion having a lower end, the lower end being positioned against the inner surface of the vessel wall, at least a portion of the vertical wall baffle being spaced apart from the inner wall surface, thereby defining a void area between the vertical wall baffle and the inner wall surface, the upper portion extending above the top surface of the bed of adsorbent material, the lower portion being submerged in the bed of adsorbent material and being adapted to prevent air or adsorbent material from flowing into the void area through the vertical wall baffle or between the lower end of the vertical wall baffle and the inner wall surface.

14. The apparatus of claim 13, wherein the upper end of the vertical wall baffle is positioned proximate to the inner surface of the vessel wall.

15. The apparatus of claim 13, wherein the vessel wall has a circumference and the vertical wall baffle substantially extends around the circumference of the vessel wall.

16. The apparatus of claim 13, wherein the void area is substantially free of the adsorbent material.

* * * * *